United States Patent
Chino et al.

(10) Patent No.: US 7,937,262 B2
(45) Date of Patent: May 3, 2011

(54) METHOD, APPARATUS, AND COMPUTER PROGRAM PRODUCT FOR MACHINE TRANSLATION

(75) Inventors: Tetsuro Chino, Kanagawa (JP); Satoshi Kamatani, Kanagawa (JP); Kentaro Furihata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 955 days.

(21) Appl. No.: 11/812,837

(22) Filed: Jun. 22, 2007

(65) Prior Publication Data

US 2008/0077391 A1    Mar. 27, 2008

(30) Foreign Application Priority Data

Sep. 22, 2006   (JP) ................... 2006-257484

(51) Int. Cl.
*G06F 17/28*   (2006.01)
(52) U.S. Cl. ................. 704/7; 704/277; 704/2
(58) Field of Classification Search .............. 704/260, 704/277, 1, 2, 3, 7, 8, 9, 10, 231, 235, 4, 704/5, 257, 270
See application file for complete search history.

(56) References Cited

U.S. PATENT DOCUMENTS

| | | | |
|---|---|---|---|
| 6,356,865 | B1 | 3/2002 | Franz et al. |
| 7,047,195 | B2 * | 5/2006 | Koizumi et al. ........... 704/260 |
| 7,421,394 | B2 * | 9/2008 | Omi et al. ............... 704/277 |
| 2003/0097250 | A1 | 5/2003 | Chino |
| 2003/0216912 | A1 | 11/2003 | Chino |
| 2004/0243392 | A1 | 12/2004 | Chino et al. |
| 2006/0217964 | A1 | 9/2006 | Kamatani et al. |
| 2006/0224378 | A1 | 10/2006 | Chino et al. |
| 2006/0271350 | A1 | 11/2006 | Chino et al. |
| 2006/0293876 | A1 | 12/2006 | Kamatani et al. |
| 2007/0073540 | A1 | 3/2007 | Hirakawa et al. |
| 2007/0124131 | A1 | 5/2007 | Chino et al. |

FOREIGN PATENT DOCUMENTS

| | | |
|---|---|---|
| JP | 4-255900 | 9/1992 |
| JP | 8-278794 | 10/1996 |
| JP | 10-143189 | 5/1998 |
| JP | 2006-12179 | 1/2006 |

OTHER PUBLICATIONS

S. Kamatani et al., Unpublished U.S. Appl. No. 11/525,796, filed Sep. 25, 2006.
Notice of Rejection issued by the Japanese Patent Office on Sep. 2, 2008, for Japanese Patent Application No. 2006-257484, and partial English-language translation thereof.

* cited by examiner

*Primary Examiner* — Huyen X. Vo
(74) *Attorney, Agent, or Firm* — Finnegan, Henderson, Farabow, Garrett & Dunner, L.L.P.

(57) ABSTRACT

A first recognizing unit recognizes a first-language speech as a first-language character string, and outputs a first recognition result. A second recognizing unit recognizes the first-language speech as a most probable first-language example from among first-language examples stored in an example storing unit, and outputs a second recognition result. A retrieving unit retrieves, when a similarity between the first recognition result and the second recognition result exceeds a predetermined threshold, a second-language example corresponding to the second recognition result from the example storing unit.

19 Claims, 14 Drawing Sheets

| WORD | PHONEME SEQUENCE | EMERGENCE RATE |
|---|---|---|
| いつ | itsu | 0.020 |
| 椅子 | isu | 0.015 |

FIG.4

| FIRST WORD | SECOND WORD | EMERGENCE RATE |
|---|---|---|
| 手 | に | 0.03 |
| 手 | 荷物 | 0.01 |

| ADDRESS | JAPANESE EXAMPLE | ENGLISH EXAMPLE | EXAMPLE TYPE |
|---|---|---|---|
| .. | .. | .. | .. |
| Y1 | 手荷物を預けるところはありますか | Is there somewhere I can leave my baggage? | SENTENCE |
| Y2 | ビジネスクラスの<X2/ロンドン>行きのチケットを予約したい | I'd like to reserve a business air ticket to <X2/London> | SENTENCE WITH VARIABLE(S) |
| Y3 | いつお発ちになりますか | When do you like to leave? | SENTENCE |
| Y4 | <X4a/これ>を<X4b/試着>してもいいですか | May I <X4b/try><X4a/this one>? | SENTENCE WITH VARIABLE(S) |
| Y5 | 今日のお勧めの料理は何ですか | What is today's special? | SENTENCE |
| .. | .. | .. | .. |
| H1 | ロンドン | London | CITY NAME |
| H2 | ロサンゼルス | Los Angeles | CITY NAME |
| .. | .. | .. | .. |
| H3 | ツイン | twin room | ROOM TYPE |
| .. | .. | .. | .. |

FIG.6

I1=[TE-NI-MO-TSU-WO-A-ZU-KE-RU-TO-KO-A-RI-MA-SU-KA]
(手荷物を預けるとこありますか)

I2=[BI-JI-NE-SU-KU-RA-SU-DE-RO-SA-N-ZE-RU-SU-I-KI-NO-CHI-KE-TTO-WO-YO-YA-KU-SHI-TA-I-DE-SU]
(ビジネスクラスでロサンゼルス行きのチケットを予約したいです)

I3=[I-SU-WO-TA-SHI-TE-KU-RE-MA-SU-KA]
(椅子を足してくれますか)

| |
|---|
| U1=「Is there somewhere I can leave my baggage?」 |
| U2=「I'd like to reserve a business air ticket to Los Angels.」 |
| U3=「When do you like to leave?」 |

FIG.13

V1=「Is there a floor where you tell the hill held in the hand?」

V2=「I reserve a business ticket for Los Angels of a life as a nonpayment.」

V3=「Could you add a chair?」

METHOD, APPARATUS, AND COMPUTER PROGRAM PRODUCT FOR MACHINE TRANSLATION

CROSS-REFERENCE TO RELATED APPLICATIONS

This application is based upon and claims the benefit of priority from the prior Japanese Patent Application No. 2006-257484, filed on Sep. 22, 2006; the entire contents of which are incorporated herein by reference.

BACKGROUND OF THE INVENTION

1. Field of the Invention

The present invention relates to a method, an apparatus, and a computer program product for machine-translating a first language speech into a second language speech.

2. Description of the Related Art

A human interface technology using a speech input has been put to practical use in recent years. As an example of the speech-based human interface technology, a voice-activated operating system is operated by a user's speech. Upon receiving a speech input instructing a predetermined command that is set by the user in advance, the voice-activated operating system recognizes the speech input and executes the command. Another example of the speech-based human interface technology is a system that analyzes a user's speech and converts the speech into a character string, to create a document.

Moreover, a speech translation system translates a speech in a first language into a speech in a second language and outputs the speech in the second language, thereby supporting a communication among people with different languages. Furthermore, a speech interaction system makes it possible for a user to interact with the system in spoken language.

In the systems described above, a speech recognition technique is used in such a manner that a speech signal included in a user's speech is converted into a digital signal and the digital signal is compared with predetermined patterns so that contents of the speech is recognized into a source text. In the speech recognition technique, to improve a recognition accuracy, a statistical language model such as an N-gram language model is used to select the most probable candidate from a plurality of candidates that are recognized from the comparison with the predetermined patterns. In this case, the most probable candidate is selected by referring to an example of speech content that is stored in advance.

Furthermore, a machine translation technique is used in the above systems, with which a source text that is content of speech in a first language obtained by using the speech recognition technique, is machine-translated into a target text in a second language as a target language. As a method for machine translation, for example, a rule-based translation, an example-based translation, and a statistical translation are currently used. In the rule-based translation method, a first language text is translated into a second language text based on rules for a correspondence between lexical structures or a correspondence between sentence structures in both languages. In the example-based translation method, bilingual example pairs, which are semantically-equivalent examples in the first language and the second language, are collected as many as possible so that a target second-language translation can be obtained by referring to the bilingual example pairs. In the statistical translation method, a translation of a first-language input, i.e., a second-language output is obtained by referring to statistical information based on a massive amount of example data.

However, in the speech recognition technique, it may happen that a recognition result is affected by a surrounding environment such as a noise, or the recognition result varies depending on user's vocal conditions such as tone, volume, and speaking speed. In addition, to support every type of speech sentences, it causes an increase in a processing load, for example, a load for comparing with the predetermined patterns. Therefore, it becomes difficult to achieve a sufficient recognition accuracy.

Furthermore, in the example-based translation, it is virtually impossible to collect examples relevant to all sentences in advance because an infinite variation of phrases exists. Therefore, it is scarcely possible that a second-language example is retrieved by the example-based translation method. In addition, although it is possible to translate any sentence by the application of generic rules in the rule-based translation method, it is still difficult to obtain a natural translation.

To solve the above problems and achieve a highly accurate translation result, U.S. Pat. No. 6,356,865 discloses a hybrid translation method that is a combination of a plurality of machine translation methods, for example, a combination of the example-based machine translation method and the rule-based machine translation method.

However, in the hybrid translation method, it is not possible to provide an appropriate input for each of the translation methods employed in the hybrid translation method. For example, in the hybrid translation method described above, only a recognition result obtained by the typical speech recognition method using, for example, a hidden Markov model (HMM), is provided as an input for translation processing.

Therefore, even in a case in which an accuracy of speech recognition can be increased if a different speech recognition method is used, a result of the machine translation is not sufficiently accurate because a machine translation process is performed based on a recognition result with low accuracy, which is obtained by the predetermined speech recognition method.

SUMMARY OF THE INVENTION

An apparatus for machine-translating a first language into a second language, according to one aspect of the present invention, includes an example storing unit that stores therein a first-language example in association with a second-language example that is a translation of the first-language example; a receiving unit that receives a first-language speech; a first recognizing unit that recognizes the first-language speech as a first-language character string, and outputs a first recognition result; a second recognizing unit that recognizes the first-language speech as a most probable first-language example from among first-language examples stored in the example storing unit, and outputs a second recognition result; a calculating unit that calculates a similarity between the first recognition result and the second recognition result; and a retrieving unit that retrieves, when calculated similarity exceeds a predetermined threshold, a second-language example corresponding to the second recognition result from the example storing unit.

An apparatus for machine-translating a first language into a second language, according to another aspect of the present invention, includes an example storing unit that stores therein a first-language example in association with a second-language example that is a translation of the first-language example; a receiving unit that receives a first-language speech; a first recognizing unit that recognizes the first-language speech as a first-language character string, and outputs a first recognition result; a second recognizing unit that recognizes the first-language speech as a most probable first-language example from among first-language examples stored in the example storing unit, calculates a first likelihood indicating a certainty of the most probable first-language example, and outputs a second recognition result including calculated first likelihood; and a retrieving unit that retrieves, when calculated first likelihood exceeds a first threshold, a second-language example corresponding to the second recognition result from the example storing unit.

A method of machine-translating a first language into a second language, according to still another aspect of the present invention, includes outputting a first recognition result by recognizing a input first-language speech as a first-language character string; outputting a second recognition result by recognizing the input first-language speech as a most probable first-language example from among first-language examples stored in an example storing unit that stores therein a first-language example in association with a second-language example that is a translation of the first-language example; calculating a similarity between the first recognition result and the second recognition result; and retrieving, when calculated similarity exceeds a predetermined threshold, a second-language example corresponding to the second recognition result from the example storing unit.

A computer program product according to still another aspect of the present invention includes a computer-usable medium having computer-readable program codes embodied in the medium that when executed cause a computer to execute outputting a first recognition result by recognizing a input first-language speech as a first-language character string; outputting a second recognition result by recognizing the input first-language speech as a most probable first-language example from among first-language examples stored in an example storing unit that stores therein a first-language example in association with a second-language example that is a translation of the first-language example; calculating a similarity between the first recognition result and the second recognition result; and retrieving, when calculated similarity exceeds a predetermined threshold, a second-language example corresponding to the second recognition result from the example storing unit.

BRIEF DESCRIPTION OF THE DRAWINGS

FIG. 4 is an example of a language model stored in a language-model storing unit shown in FIG. 1;

FIG. 5 is an example for explaining bilingual example pairs stored in an example storing unit shown in FIG. 1;

FIG. 6 is examples of input speeches;

FIG. 7 is examples of recognition results obtained by a generic speech recognition method;

FIG. 8 is examples of recognition results obtained by an example-based speech recognition method;

FIG. 9 is examples for explaining alignment information;

FIG. 10 is examples of translation results obtained by an example-based translation method;

FIG. 13 is examples of translation results obtained by a rule-based translation method;

DETAILED DESCRIPTION OF THE INVENTION

Exemplary embodiments of the present invention are explained in detail below with reference to the accompanying drawings.

A machine translation apparatus according to a first embodiment of the present invention can achieve a higher accuracy of a translation result by referring to both recognition results obtained by a generic recognition method capable of recognizing any speech content and an example-based recognition method capable of recognizing speech content corresponding to examples those stored in advance.

A translation of Japanese into English is explained in the embodiments. However, the present invention is not limited to Japanese and English as a source language and a translating target language, and can be applied to any other languages.

Figure 1:
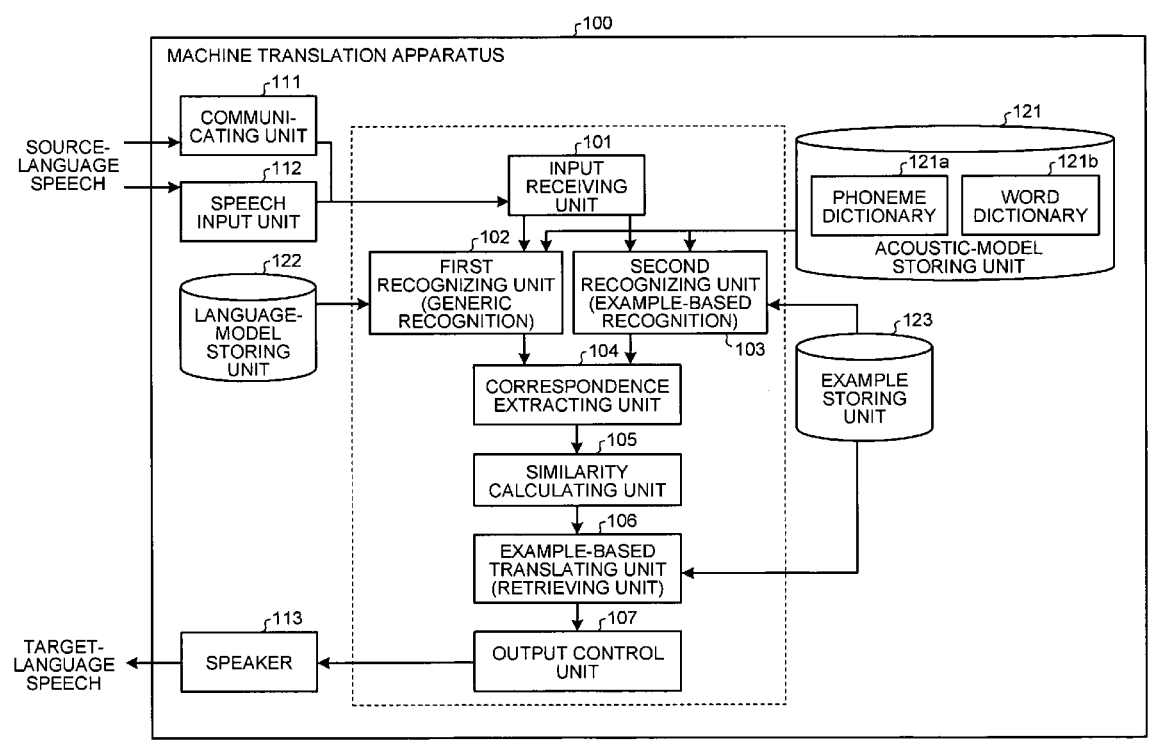
FIG. 1 is a block diagram of a machine translation apparatus according to a first embodiment of the present invention.

FIG. 1 is a block diagram of a machine translation apparatus 100 according to the first embodiment. The machine translation apparatus 100 includes a communicating unit 111, a speech input unit 112, a speaker 113, an acoustic-model storing unit 121, a language-model storing unit 122, an example storing unit 123, an input receiving unit 101, a first recognizing unit 102, a second recognizing unit 103, a correspondence extracting unit 104, a similarity calculating unit 105, an example-based translating unit 106, and an output control unit 107.

The communicating unit 111 receives speech data transmitted from an external device (not shown), and outputs the speech data to the input receiving unit 101. The speech input unit 112 converts an input speech into an electrical signal (the speech data), and outputs the speech data to the input receiving unit 101.

Incidentally, at least either the communicating unit 111 or the speech input unit 112 is to be included in the machine translation apparatus 100 to receive the speech data.

The speaker 113 outputs a synthesized speech as a recognition result or a translation result. In the present embodiments, a synthesized speech is output as a translation result. However, an output method of the translation result is not limited to a speech output, and any kinds of conventionally-used output methods can be used. For example, a translation result in text format can be displayed on a display unit (not shown).

The acoustic-model storing unit 121 stores therein an acoustic model in which a predetermined reference pattern of a speech feature is corresponded to a word as a unit of speech recognition.

Specifically, the acoustic-model storing unit 121 includes a phoneme dictionary 121*a* and a word dictionary 121*b*. The phoneme dictionary 121a stores therein a reference pattern of a feature with respect to each of phonemes that are stored therein in advance. The word dictionary 121b stores therein word data for verifying the input speech.

The phoneme dictionary 121a is identical to a dictionary used in the conventional speech recognition method using a hidden Markov model (HMM). In the phoneme dictionary 121a, verifiable feature time-series data as the reference pattern, which is in the same form as a feature calculated by the first recognizing unit 102, is stored therein together with a phoneme label in-associated manner.

Figures 2, 3:
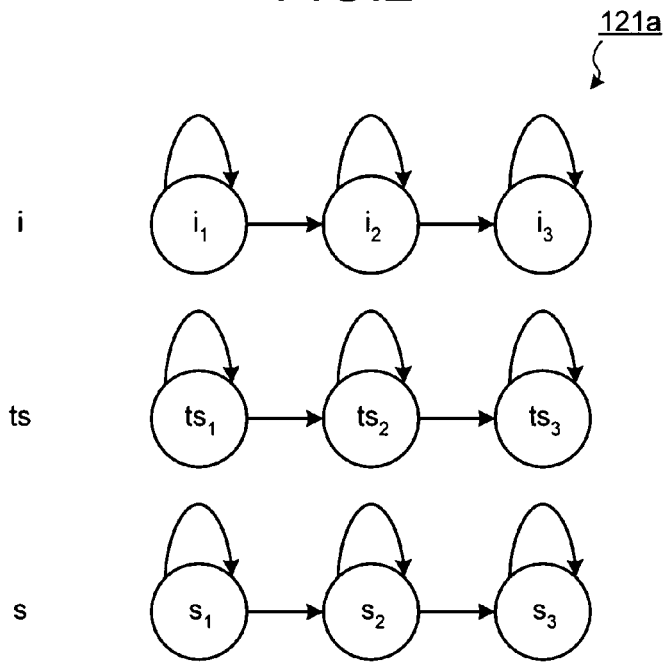
FIG. 2 is an example of a phoneme dictionary.
FIG. 3 is an example of a word dictionary.

FIG. 2 is an example of the phoneme dictionary 121a. As shown in FIG. 2, in the phoneme dictionary 121a, the feature time-series data is expressed by finite-state automata including nodes and directed links.

Each of the nodes expresses a state for verification. For example, the nodes corresponding to a phoneme "i" respectively express "i1", "i2", and "i3", which are respectively different states of the phoneme "i". The directed links are respectively corresponded to a feature (not shown) as a sub-element of a phoneme.

The word dictionary 121b is identical to a dictionary used in the conventional HMM-based speech recognition method. The word dictionary 121b preliminarily stores therein phoneme sequences, which respectively correspond to each single word, and used to obtain a word corresponding to a phoneme sequence obtained by a verification based on the phoneme dictionary 121a.

FIG. 3 is an example of the word dictionary 121b. As shown in FIG. 3, the word dictionary 121b stores therein in associated manner a word, a phoneme sequence composing the word, and an emergence rate of the word, which is calculated in advance by using a massive amount of speech data and text corpora.

The acoustic models stored in the acoustic-model storing unit 121 are referred to when the first recognizing unit 102 and the second recognizing unit 103 recognize a word corresponding to a speech. Incidentally, the acoustic models are not limited to those described above, and can use any kinds of conventionally-used models in the speech recognition process, for example, an HMM, a dynamic programming (DP) model, and neural network (NN) model.

The language-model storing unit 122 stores therein a language model in which a connecting relationship between words is determined in advance. The language model is identical to, for example, an HMM that is used in the speech recognition process, and used to select a most probable word sequence from word sequences obtained as intermediate data.

FIG. 4 is an example of a language model stored in the language-model storing unit 122. In the example shown in FIG. 4, a bi-gram language model for a two-word conjunction is employed.

Specifically, in the language model shown in FIG. 4, two words (the first word and the second word) are associated with the emergence rate. The emergence rate is obtained in advance by analyzing a massive amount of text corpora. Incidentally, the language model is not limited to the bi-gram language model. Alternatively, a tri-gram model for a three-word conjunction can be used as the language model.

The example storing unit 123 stores therein bilingual example pairs that include semantically-equivalent examples in a source language and a target language in associated manner. FIG. 5 is an example for explaining bilingual example pairs stored in-the example storing unit 123.

As shown in FIG. 5, the example storing unit 123 stores therein examples of bilingual example pairs, that respectively include in associated manner an address for uniquely-identifying each of the examples, a Japanese example, an English example, and an example type, i.e., a type of the Japanese and English examples. As the example type, for example, information on a sentence type or a meaning of a word is indicated. As the sentence type, for example, it is indicated whether an example is either a sentence or a sentence with variable(s) including a variable portion, i.e., a replaceable word. As the meaning of a word, for example, a city name or a room type is indicated. Additionally, the example type can be classified by parts of a speech, meanings, or semantic primitives so as to select an example with high accuracy.

As shown in FIG. 5, in an entry of an address=Y1, a Japanese example 201 and an English example 202: "Is there somewhere I can leave my baggage?" are semantically-equivalent bilingual example pairs, and an example type of the Japanese example 201 and the English example 202 is "a sentence".

Likewise, in an entry of an address=Y2, a Japanese example 203 and an English example 204: "I'd like to reserve a business air ticket to <X2/London>" are semantically-equivalent bilingual example pairs, and an example type of the Japanese example 203 and the English example 204 is "a sentence with variable(s)".

The variable portion denotes a word that can be replaced by other word, and the variable portion included in both a Japanese example and an English example is enclosed in angle brackets "<" and ">". A portion before a slash "/", which is included in the variable portion, denotes an identifier that uniquely identifies a variable. A portion after the slash "/" denotes a tangible example of the variable, which is an actual part of the example.

Namely, if all the angle brackets "<" and ">", the slash "/", and the identifier "X2" are removed from the Japanese example 203 and the English example 204, actual examples of the Japanese example 203 and the English example 204 are indicated.

Furthermore, the variable portions included in the Japanese example 203 and the English example 204 have the same identifier, and thus the variable portions are associated with each other. Therefore, the variable portions can be replaced by a semantically equivalent phrase in Japanese and English respectively.

In an entry of an address=Y4, a plurality of variable portions is included in each of a Japanese example and an English example those are bilingual example pairs.

In an entry of an address=H1, a Japanese example 205 and an English example 206 (London) are semantically-equivalent bilingual example pairs, and an example type of the Japanese example 205 and the English example 206 is a city name. Likewise, in an entry of an address=H2, a Japanese example 207 and an English example 208: "Los Angels" are semantically-equivalent bilingual example pairs, and an example type of the Japanese example 207 and the English example 208 is a city name.

The acoustic-model storing unit 121, the language-model storing unit 122, and the example storing unit 123 can be configured by a commonly-used recording medium such as a hard disk drive (HDD), a optical disk, a memory card, or a random access memory (RAM).

The input receiving unit 101 receives an input signal of a user's speech in Japanese via a microphone (not shown) or the like, and converts the input signal into an electronic signal, and then takes samplings of the electronic signal on a minimal time basis and converts into digital data by using an analog-to-digital (A/D) converter (not shown) or the like. After that, the input receiving unit 101 outputs speech waveform data that is converted into digital data, such as time-series data on waveform amplitude. The above process can be performed by a conventional speech digitization method. If the input receiving unit 101 receives speech waveform data that is already converted into digital data from the communicating unit 111, the input receiving unit 101 needs not perform the above conversion process.

FIG. 6 is examples of three input speeches I1, I2, and I3. Incidentally, a parenthetic Japanese corresponding to each of the input speeches is indicated by a mixture of Chinese characters and Japanese phonetic characters for a descriptive purpose.

Upon receiving the speech waveform data output from the input receiving unit 101, the first recognizing unit 102 performs a speech dictation process. Namely, the first recognizing unit 102 converts a Japanese speech into a Japanese text, and then outputs a first recognition result (hereinafter, "a generic recognition result") that includes a recognition result of the Japanese text and a generic recognition score denoting a certainty of the recognition result.

Specifically, the first recognizing unit 102 calculates a feature of a speech signal by analyzing a time variation of frequencies, for example, by the application of a fast Fourier transform (FFT) analysis.

Then, the first recognizing unit 102 verifies the calculated feature by comparing with an acoustic model stored in the acoustic-model storing unit 121 by the application of the (for example, HMM, DP, or NN-based) speech recognition method, and creates recognition candidates of speech content.

The first recognizing unit 102 estimates and selects a most probable candidate from the created recognition candidates by using a language model, so that a recognition result of the speech recognition process can be highly accurate. A speech dictation technique, which is already put to practical use, can be applied to the speech recognition process performed by the first recognizing unit 102 by using the acoustic model and the language model.

FIG. 7 is examples of generic recognition results. Japanese texts S1, S2, and S3 are respectively recognition results of the input speeches I1, I2, and I3, obtained by the generic speech recognition process.

Each of the generic recognition results is indicated by a Japanese text Sn and a generic recognition score Qn. Incidentally, "n" is used as an identification number. For example, Japanese text S3 denoting "Could you add a chair?" is indicated as the recognition result of the input speech I3, and "Q3=80" is indicated as the generic recognition score. Incidentally, as shown in FIG. 7, the Japanese texts S1 and S2 are examples of results that are misrecognized, but the Japanese text S3 is an example of a result that is correctly recognized.

Upon receiving the speech waveform data output from the input receiving unit 101, the second recognizing unit 103 recognizes the speech waveform data by referring to Japanese examples stored in the example storing unit 123 as recognition candidates, and outputs a second recognition result (hereinafter, "an example-based recognition result") that includes an address in the example storing unit 123, a Japanese example, and an example-based recognition score denoting a certainty of the recognition result of each of the recognition candidates.

In the process of searching the recognition candidates, which is included in a speech recognition process in the same manner as the conventional speech recognition process performed by the first recognizing unit 102, as soon as the second recognizing unit 103 finds out that a candidate is not included in Japanese examples stored in the example storing unit 123 even during interpretation, the second recognizing unit 103 rejects the candidate.

Incidentally, it is also possible to prepare an automaton in advance so that the second recognizing unit 103 can receive all the Japanese examples stored in the example storing unit 123. Thus, the second recognizing unit 103 can perform the process efficiently. Alternatively, language models applicable to all the Japanese examples stored in the example storing unit 123 are prepared in advance so that the second recognizing unit 103 can use the language models in the process of the recognition. In this case, the recognition process is performed by the first recognizing unit 102 and the second recognizing unit 103 in common, and the language model is changed depending on either the first recognizing unit 102 or the second recognizing unit 103.

As described above, the second recognizing unit 103 recognizes specifically for the Japanese examples stored in the example storing unit 123. Therefore, if a speech input is identical or similar to any one of the Japanese examples stored in the example storing unit 123, the second recognizing unit 103 can accurately recognize the speech input compared to the generic speech recognition process performed by the first recognizing unit 102.

Moreover, if a speech input is not similar to any of the Japanese examples stored in the example storing unit 123, the second recognizing unit 103 can reject the speech input at a higher rate than that is the first recognizing unit 102.

FIG. 8 is examples of example-based recognition results R1, R2, and R3. The example-based recognition results R1, R2, and R3 are respectively recognition results of the input speeches I1, I2, and I3, obtained by the example-based speech recognition process;

Each of the example-based recognition results is indicated by an address Yn in the example storing unit 123, a Japanese example corresponding to the address Yn, and an example-based recognition score Pn. For example, in the first example, an address "Y1" and a Japanese example denoting "Is there somewhere I can leave my baggage?" are indicated as the example-based recognition result R1 of the speech input I1, and further "P1=85" is indicated as an example-based recognition score. In the second example, a Japanese example in an address Y2, which is a sentence with a variable, is indicated as the example-based recognition result R2.

The correspondence extracting unit 104 extracts a correspondence relation between the Japanese example included in the example-based recognition result and the Japanese text included in the generic recognition result. The correspondence extracting unit 104 can perform the correspondence extracting process by the application of the conventionally-used DP-based extracting method so as to associate matched or mismatched portions between two character strings with each other. Incidentally, it is possible to associate the portions by each character or by each word.

Alternatively, the correspondence extracting unit 104 can associate words included in a first portion of the input speech, so that the correspondence extracting unit 104 can accurately extract a correspondence relation between the words by using time-series data on the input speech.

The similarity calculating unit 105 calculates a similarity between the example-based recognition result and the generic recognition result, which are associated by the correspondence extracting unit 104. Also, the similarity calculating unit 105 outputs alignment information that includes the correspondence relation and the similarity in associated manner. The similarity calculating unit 105 can calculate the similarity by any conventionally-used method. For example, the similarity calculating unit 105 can obtain the similarity based on an edit distance between two character strings.

FIG. 9 is examples for explaining alignment information. Alignment information A2 is obtained based on the generic recognition result S2 and the example-based recognition result R2 those corresponding to the speech input I2. Alignment information A3 is obtained based on the generic recognition result S3 and the example-based recognition result R3 those corresponding to the speech input I3.

Each of the alignment information is indicated by an alignment result An and a similarity Mn in pairs. A mismatched portions of the alignment result An is enclosed in round brackets "(" and ")", and further separated by a vertical "|". The example-based recognition result is indicated in the left side of the vertical "|", and the generic recognition result is indicated in the right side of the vertical "|". The rest of the alignment result An is indicated as it is.

For example, the alignment result A3 includes four mismatched portions in which example-based recognition result and the generic recognition result are respectively indicated in the left side and the right side of a vertical "|". The rest of the alignment result A3, which is not enclosed in round brackets "(" and ")", denotes a matched portion of the example-based recognition result and the generic recognition result.

The example-based translating unit 106 (retrieving unit 106) performs an example-based translation process that translates a Japanese character string into an English character string by retrieving examples stored in the example storing unit 123. Then, the example-based translating unit 106 outputs an example-based recognition result including an example-based translation result and a certainty of the example-based translation result.

Specifically, the example-based translating unit 106 determines a similarity between the received Japanese character string and each of entries of Japanese examples stored in the example storing unit 123, and obtains a translation result of the Japanese character string by using an English example corresponding to one of the entries of the Japanese examples, which has the highest similarity. In the example-based translation process, the example-based translating unit 106 refers to a correspondence relation between a Japanese word and an English word, if necessary.

The example-based translation process performed by the example-based translating unit 106 is not limited to the above method. Any kinds of translation methods are applicable as long as a translation result is obtained based on examples that are prepared in advance.

FIG. 10 is examples of three example-based translation results U1, U2, and U3 of the speech inputs I1, I2, and I3 respectively.

In the example of the example-based translation result U1, the English example of the address Y1 stored in the example storing unit 123 is output as the translation result without any changes. In the example of the example-based translation result U2, the variable portion X2: "London" of the English example of the address Y2 stored in the example storing unit 123 is replaced by the English example of the address H2: "Los Angels". In the example of the example-based translation result U3, the English example of the address Y3 stored in the example storing unit 123 is output as the translation result without any changes.

The output control unit 107 converts textual information of the translation result into a synthesized speech, and outputs the synthesized speech to the speaker 113. Any kinds of commonly-used speech synthesis methods can be applied to the speech synthesis process performed by the output control unit 107. For example, the phoneme edited speech synthesis, the formant speech synthesis, the phonetic corpus-based speech synthesis, or the text-to-speech synthesis is cited as the speech synthesis method. Also, if a display unit as an output device is included in the machine translation apparatus, the output control unit 107 can display the translation result on a display screen of the display unit.

A machine translation process performed by the machine translation apparatus 100 according to the first embodiment is described in detail below with reference to FIG. 11.

The input receiving unit 101 receives a speech input from the communicating unit 111 or the speech input unit 112 (step S1101). The input receiving unit 101 determines whether the speech is input (step S1102). If the speech is not input (NO at step S1102), the input receiving unit 101 repeats the determination until the speech is input (step S1101).

If the speech is input (YES at step S1102), the first recognizing unit 102 performs a generic speech recognition process on the input speech (step S1103). Specifically, the first recognizing unit 102 calculates a feature of the speech by the application of the FFT analysis or the like, and retrieves candidate words corresponding to the calculated feature from the acoustic-model storing unit 121. Then, the first recognizing unit 102 selects a most probable candidate word from the retrieved candidate words by referring to a language model, and outputs the selected candidate word together with a generic recognition score denoting a certainty of the selected candidate word, those as a generic recognition result.

The second recognizing unit 103 performs an example-based speech recognition process on the input speech (step S1104). Specifically, the second recognizing unit 103 calculates a feature of the speech by the application of the FFT analysis or the like, and retrieves candidate words corresponding to the calculated feature from the acoustic-model storing unit 121. Then, the second recognizing unit 103 selects a most probable example from examples including the retrieved candidate words, which are stored in the example storing unit 123, and outputs the selected example together with an example-based recognition score denoting a certainty of the selected example, those as an example-based recognition result.

The correspondence extracting unit 104 extracts a correspondence relation between the generic recognition result and the example-based recognition result (step S1105). Specifically, the correspondence extracting unit 104 extracts a matched or mismatched portion between the generic recognition result and the example-based recognition result by the application of the DP-based extracting method or the like.

The similarity calculating unit 105 calculates a similarity between the generic recognition result and the example-based recognition result based on an edit distance between the generic recognition result and the example-based recognition result (step S1106).

The example-based translating unit 106 determines whether the similarity exceeds a first threshold (step S1107). If the similarity exceeds the first threshold (YES at step S1107), the example-based translating unit 106 retrieves a translation of the example-based recognition result from examples stored in the example storing unit 123 (step S1108).

When the generic recognition result and the example-based recognition result are similar to each other, it is determined that the example-based recognition result has a higher certainty. Therefore, it is preferable to use a translation of the example-based recognition result without any changes.

If the similarity is below the first threshold (NO at step S1107), the example-based translating unit 106 further determines whether the similarity is below a second threshold that is a lower amount than the first threshold (step S1109).

If the similarity is below the second threshold (YES at step S1109), the system control proceeds to step S1101 because it is determined that the recognition accuracy is low.

If the similarity exceeds the second threshold (NO at step S1109), the example-based translating unit 106 replaces a translation corresponding to a mismatched portion of the example-based recognition result by a translation corresponding to a mismatched portion of the generic recognition result (step S1110).

For example, when a speech, which is identical to an example stored in the example storing unit 123 but except for a variable portion, is input, a correct translation can be probably obtained by replacing only a translation of the variable portion with another translation. Therefore, the example-based translating unit 106 retrieves an English example corresponding to the mismatched portion, i.e., the variable portion, from English examples stored in the example storing unit 123, and replaces the translation of the mismatched portion by the retrieved English example, and then outputs a translation of the whole input speech.

Specifically, for example, when a Japanese speech denoting "I'd like to reserve a business air ticket to Los Angels." is input, the entry of the address=Y2 shown in FIG. 5 is retrieved as a most probable example, but it is assumed that a similarity of the example is below the first threshold (for example, 80) and exceeds the second threshold (for example, 70).

In this case, the English example 208 "Los Angels" (see FIG. 5) can be retrieved as an English example corresponding to a mismatched portion. Therefore, a word "London", which is a variable portion included in the English example 204 of the entry of the address=Y2, is replaced by the English example 208 "Los Angels", and then an English example: "I'd like to reserve a business air ticket to Los Angels." is output.

After the example-based translating unit 106 obtains the translation at step S1108 or step S1110, the output control unit 107 synthesizes a speech of the translation and outputs the synthesized speech to the speaker 113 (step S1111). Then, the machine translation process is terminated.

As described above, the machine translation apparatus 100 according to the first embodiment refers to both recognition results obtained by the generic recognition method capable of recognizing any speech content and the example-based recognition method capable of recognizing speech content only corresponding to examples those stored in advance. Then, the machine translation apparatus 100 employs the recognition result obtained by the example-based recognition method, if a certainty of the example-based recognition result is sufficiently high. Furthermore, even if the certainty of the example-based recognition result is not sufficiently high, the machine translation apparatus 100 can output an example that is partially replaced by a generic recognition result. In other words, the machine translation apparatus 100 can translate in an appropriate manner by using separate recognition results that are obtained by a plurality of different speech recognition methods, and thereby improving the accuracy of the machine translation.

According to the first embodiment, the machine translation apparatus 100 employs the example-based machine translation method only. A machine translation apparatus 1200 according to a second embodiment of the present invention employs not only the example-based machine translation method but also the rule-based machine translation method. Namely, the machine translation apparatus 1200 selectively employs either the rule-based machine translation method or the example-based machine translation method depending on a generic recognition result and an example-based recognition result.

Figure 12:
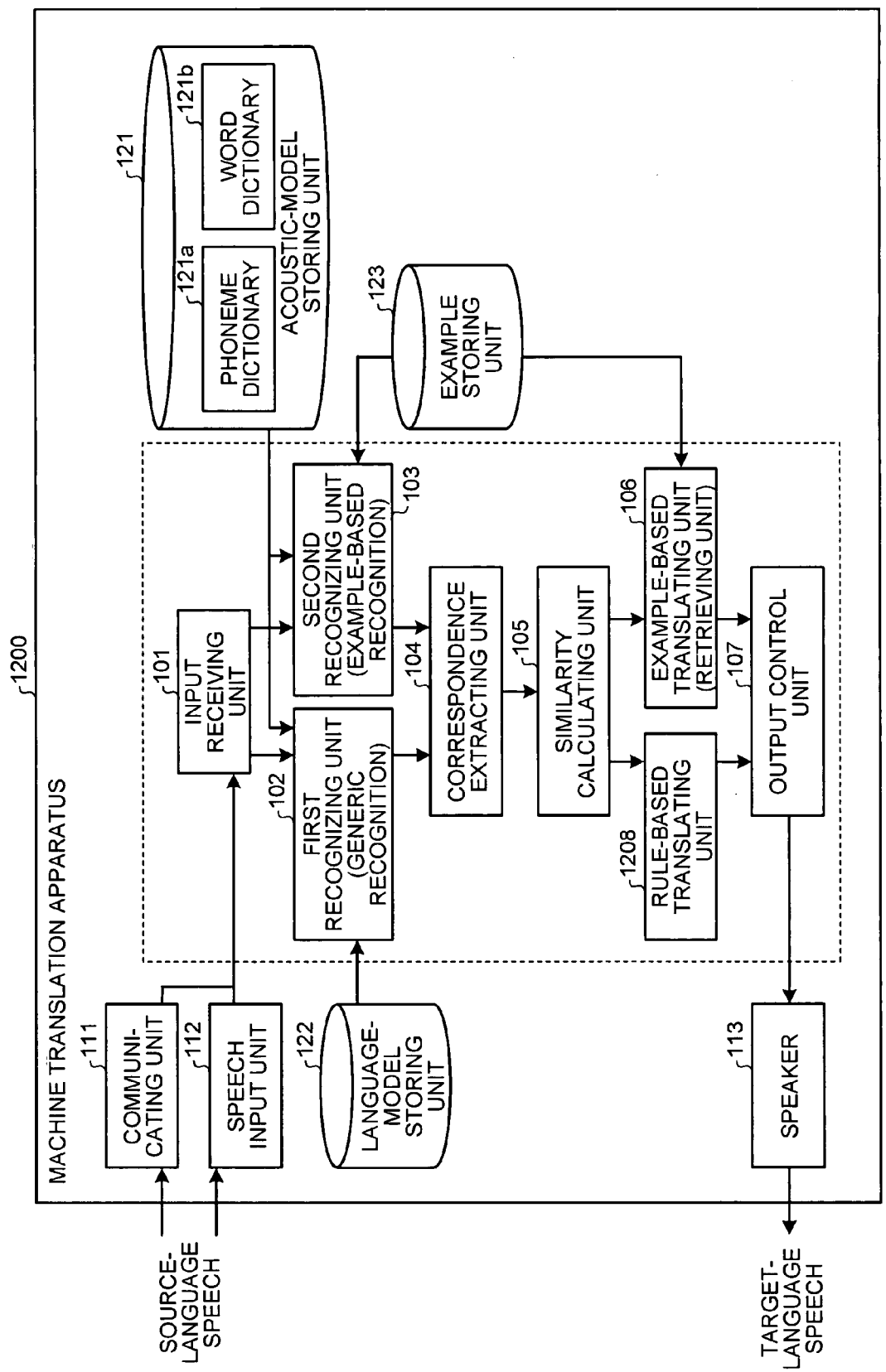
FIG. 12 is a block diagram of a machine translation apparatus according to a second embodiment of the present invention.

FIG. 12 is a block diagram of the machine translation apparatus 1200. As shown in FIG. 12, the machine translation apparatus 1200 includes the communicating unit 111, the speech input unit 112, the speaker 113, the acoustic-model storing unit 121, the language-model storing unit 122, the example storing unit 123, the input receiving unit 101, the first recognizing unit 102, the second recognizing unit 103, the correspondence extracting unit 104, the similarity calculating unit 105, the example-based translating unit 106, the output control unit 107, and a rule-based translating unit 1208.

A difference between the machine translation apparatuses 100 and 1200 according to the first and second embodiments is that the machine translation apparatus 1200 further includes the rule-based translating unit 1208. The portions identical to those in FIG. 1 are denoted with the same reference numerals and the description of those portions is omitted.

The rule-based translating unit 1208 translates any Japanese character string into a semantically-equivalent English character string based on grammars and dictionaries for both Japanese and English, and preliminarily-prepared rules for, for example, a correspondence relation between Japanese vocabulary and English vocabulary, and a semantic correspondence relation between Japanese and English. Then, the rule-based translating unit 1208 outputs rule-based translation information that includes a rule-based translation result and a rule-based translation score denoting a certainty of the rule-based translation result.

Any kinds of conventionally-used rule-based translation methods such as a transfer method can be applied to a rule-based translation process performed by the rule-based translating unit 1208. Alternatively, the rule-based translating unit 1208 can employ a statistical translation method that obtains a translation of a source language input by referring to statistical information on correspondence relations between source language phrases and target language phrases those are prepared in advance based on a massive amount of example data.

FIG. 13 is examples of translation results obtained by the rule-based translation method. The rule-based translating unit 1208 translates the Japanese texts S1, S2, and S3, which are respectively generic recognition results of the input speeches I1, I2, and I3, into English based on the rules, and obtains rule-based translation results V1, V2, and V3.

Namely, the V1="Is there a floor where you tell the hill held in the hand?" is a rule-based translation result of the Japanese text S1. The V2="I reserve a business ticket for Los Angels of a life as a nonpayment." is a rule-based translation result of the Japanese text S2. The V3="Could you add a chair?" is a rule-based translation result of the Japanese text S3.

Figure 14:
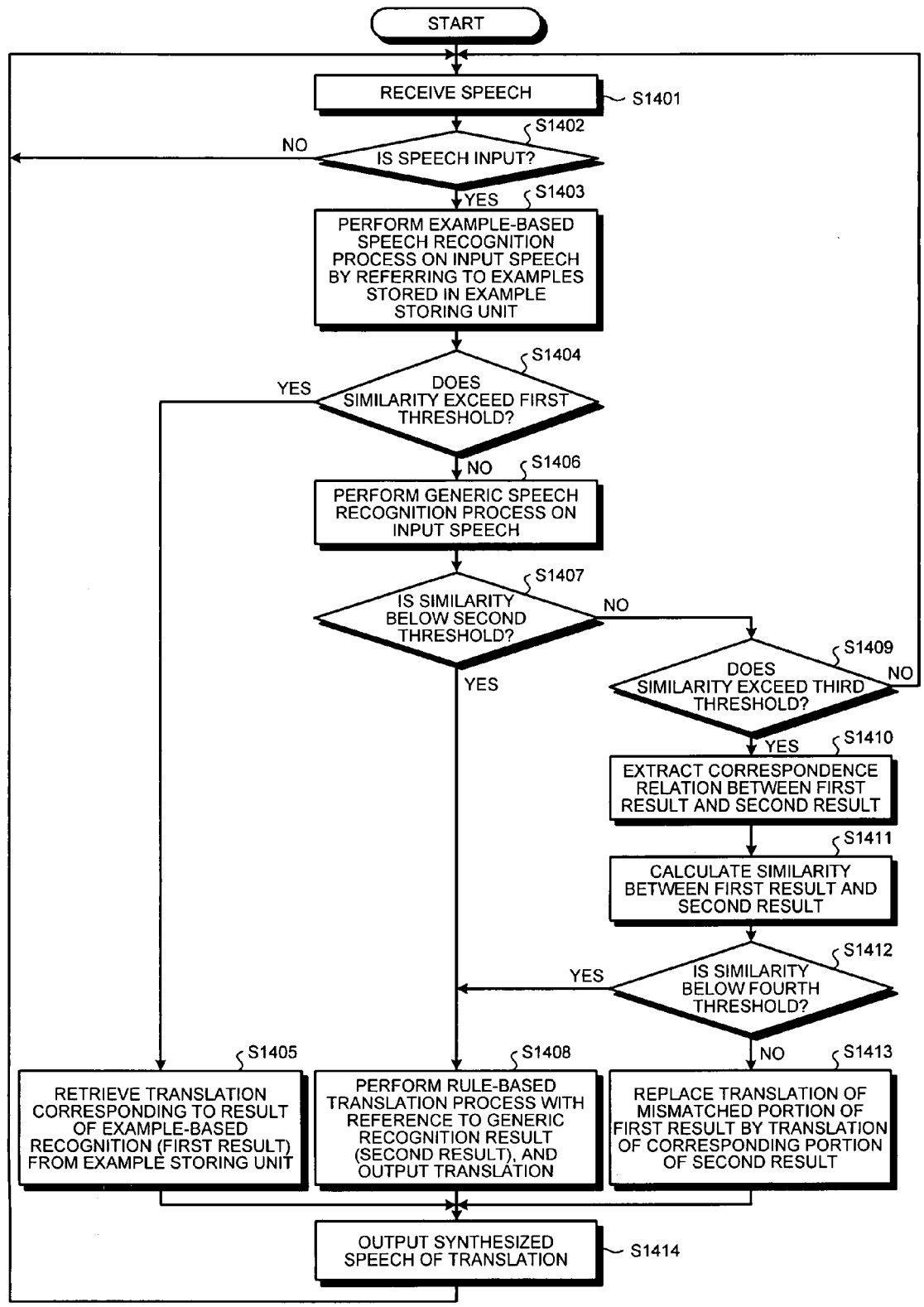
FIG. 14 is a flowchart of a machine translation process performed by the machine translation apparatus according to the second embodiment.

A machine translation process performed by the machine translation apparatus 1200 is described in detail below with reference to FIG. 14.

Figure 11:
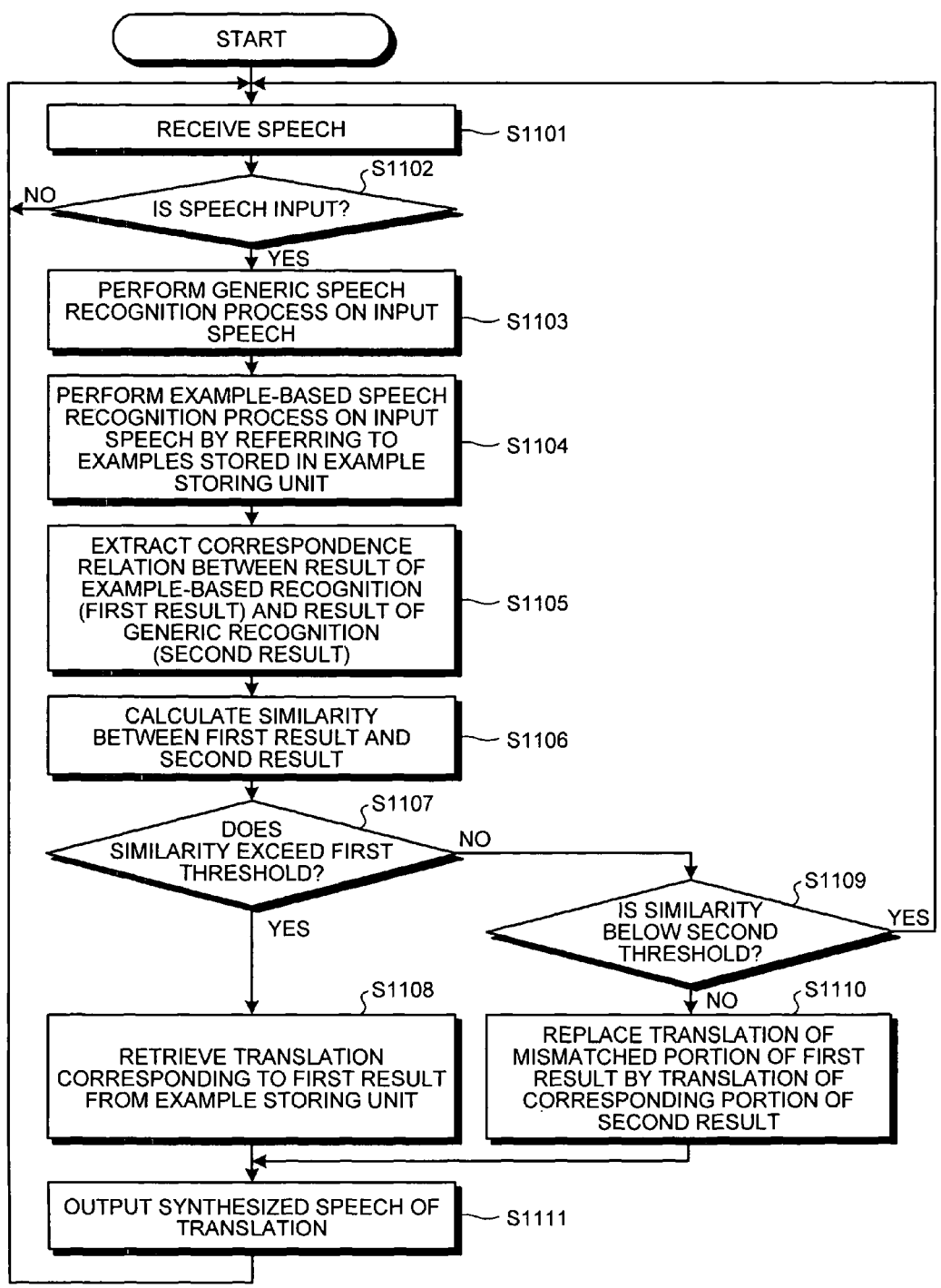
FIG. 11 is a flowchart of a machine translation process performed by the machine translation apparatus according to the first embodiment.

A speech-input receiving process in steps S1401 and S1402 is identical to that is in steps S1101 and S1102 shown in FIG. 11, and thus the description of steps S1401 and S1402 is omitted.

If a speech is input (YES at step S1402), the second recognizing unit 103 performs the example-based speech recognition process on the input speech by referring to examples stored in the example storing unit 123 (step S1403). The process at step S1403 is identical to that is at step S1104 shown in FIG. 11.

The example-based translating unit 106 determines whether an example-based recognition score included in the example-based recognition result exceeds a first threshold (step S1404). Incidentally, thresholds defined in the second embodiment are not relevant to those defined according to the first embodiment.

If the example-based recognition score exceeds the first threshold (YES at step S1404), the example-based translating unit 106 retrieves a translation of the example-based recognition result from examples stored in the example storing unit 123 (step S1405). In this case, it is determined that the example-based recognition result has a higher certainty, and thus it is preferable to use a translation of the example-based recognition result as it is.

If the example-based recognition score is below the first threshold (NO at step S1404), the first recognizing unit 102 performs the generic speech recognition process on the input speech (step S1406). The process at step S1406 is identical to that is at step S1103 shown in FIG. 11.

As described above, the machine translation apparatus 1200 according to the second embodiment performs the example-based recognition process first. Only if the example-based recognition result does not have enough certainty, the machine translation apparatus 1200 performs the generic recognition process. Therefore, it is possible to prevent unnecessary processes. In other words, it is possible to minimize necessary processes.

The rule-based translating unit 1208 determines whether the example-based recognition score is below a second threshold that is a lower amount than the first threshold (step S1407). If the example-based recognition score is below the second threshold (YES at step S1407), the rule-based translating unit 1208 performs a rule-based translation process by referring to the generic recognition result (step S1408).

If the example-based recognition score is not sufficiently high, it is determined that content of the input speech does not correspond to any examples stored in the example storing unit 123. Therefore, the rule-based translation method capable of translating any sentence is used instead of the example-based translation method.

If it is determined that the example-based recognition score is not below the second threshold (NO at step S1407), the correspondence extracting unit 104 determines whether the generic recognition score included in the generic recognition result exceeds a third threshold (step S1409).

If the generic recognition score is below the third threshold (NO at step S1409), it is determined that the recognition accuracy is not sufficiently high, and thus the system control proceeds to step S1401.

If the generic recognition score exceeds the third threshold (YES at step S1409), the correspondence extracting unit 104 extracts a correspondence relation between the generic recognition result and the example-based recognition result (step S1410). The process at step S1410 is identical to that is at step S1105 shown in FIG. 11. Then, the similarity calculating unit 105 calculates a similarity between the generic recognition result and the example-based recognition result (step S1411). The process at step S1411 is identical to that is at step S1106 shown in FIG. 11.

The example-based translating unit 106 determines whether the similarity is below a fourth threshold (step S1412). If the similarity is below the fourth threshold (YES at step S1412), it is determined that the example-based recognition result is not sufficiently accurate. Therefore, the rule-based translating unit 1208 performs the rule-based translation process by referring to the generic recognition result (step S1408).

For example, even if content of the input speech does not correspond to any examples stored in the example storing unit 123, one of the examples having a highest example-based recognition score is selected because each of the examples is verified in the example-based recognition process. In this case, a misrecognized example is selected, so that the accuracy of the example-based recognition result decreases. On the other hand, in the generic recognition process, each of words is verified, and thus the generic recognition result is rarely far from the speech content.

As described above, the machine translation apparatus 1200 according to the second embodiment determines whether speech content that is not stored as an example is input depending on whether a correspondence relation between a generic recognition result and an example-based recognition result can be extracted. If the correspondence relation can not be extracted, the machine translation apparatus 1200 performs the rule-based translation process by referring to the generic recognition result. Therefore, the machine translation apparatus 1200 can select an appropriate translation method depending on recognition results obtained by a plurality of different speech recognition methods. Thus, the machine translation apparatus 1200 can output a translation result with high accuracy.

If the similarity is not below the fourth threshold (NO at step S1412), the example-based translating unit 106 replaces a translation corresponding to a mismatched portion of the example-based recognition result by a translation of the generic recognition result corresponding to the mismatched portion (step S1413). The process at step S1413 is identical to that is at step S1110 shown in FIG. 11.

Namely, if a certain degree of recognition accuracy is obtained in the example-based recognition process (NO at step S1404 and NO at step S1407), and also if enough recognition accuracy is obtained in the generic recognition process (YES at step S1409), and also if it is determined that the example-based recognition result and the generic recognition result are correspondingly similar to each other (NO at step S1412), it is determined that the input speech is identical to an example but excluding a variable portion of the example. Therefore, to obtain a correct translation, it is enough to replace the variable portion of the example by a portion of the generic recognition result corresponding to the variable portion.

After the example-based translating unit 106 or the rule-based translating unit 1208 obtains or outputs the translation at step S1405, S1408, or S1413, the output control unit 107 synthesizes a speech of the translation and outputs the synthesized speech to the speaker 113 (step S1414). Then, the machine translation process is terminated.

The machine translation process performed by the machine translation apparatus 1200 is described more specifically by using the examples shown in FIG. 6. It is assumed that the speeches I1, I2, and I3 are translated into English speeches, and the English speeches are output. Moreover, it is assumed that the first to fourth thresholds are respectively set to 80, 60, 70, and 75.

First, it is assumed that the Japanese speech I1 is input. Incidentally, the speech I1 corresponds to the Japanese example 201 at the address Y1 shown in FIG. 5, but some portions of the Japanese example 201, such as a post positional word functioning as an auxiliary to a main word, are omitted in the speech I1.

Then, it is assumed that the R1 shown in FIG. 8 is obtained as the example-based recognition result of the speech I1. The example-based recognition result R1 does not strictly correspond to the speech I1, but expresses almost equivalent content to the speech I1. Therefore, the example-based recognition result R1 is selected as a most probable example. At this time, the example-based recognition score of the R1 is 85 that is larger than the first threshold (=80) (YES at step S1404), and thus the example-based translation result is employed (step S1405). In this case, the correct English example 202: "Is there somewhere I can leave my baggage?" can be retrieved as a translation result from English examples stored in the example storing unit 123.

As described above, even if the input speech is slightly different from the example, the speech is correctly recognized by the example-based recognition method. In other words, a correct translation can be retrieved even if the speech is slightly different from the example, and thus it is possible to output the translation with high quality.

Also, in this case, the generic recognition process (step S1406) and the rule-based translation process (step S1408) are not performed because those processes are not necessary. Therefore, processing loads can be advantageously reduced.

If the generic recognition process on the speech I1 is performed, the speech I1 is probably misrecognized because a post positional word and the like are omitted in the speech I1. For example, in the case of the Japanese text S1 shown in FIG. 7, the misrecognized result is output, and also a generic recognition score of the Japanese text S1 gets a relatively low score (Q1=70).

However, the machine translation apparatus 1200 according to the second embodiment can employ a recognition result obtained by the example-based speech recognition method capable of recognizing a speech with high accuracy. Therefore, the machine translation apparatus 1200 can avoid outputting a misrecognized translation result that is obtained by the generic speech recognition method, for example, in the manner of the translation result V1: "Is there a floor where you tell the hill held in the hand?" as shown in FIG. 13.

Subsequently, it is assumed that the Japanese speech I2 (see FIG. 6) is input. Incidentally, the speech I2 corresponds to the Japanese example 203 at the address Y2 shown in FIG. 5, but some portions of the Japanese example 203, such as a variable portion, are different from the speech I2.

Then, it is assumed that the R2 shown in FIG. 8 is obtained as the example-based recognition result of the speech I2. At this time, the example-based recognition score of the example-based recognition result R2 is 75 that is smaller than the first threshold (=80) (NO at step S1404), and thus the generic recognition process is performed on the speech I2 (step S1406).

By performing the generic recognition process, it is assumed that the Japanese text S2 and the generic recognition score Q2=75 are obtained (see FIG. 7). In this case, the example-based recognition score (75) is larger than the second threshold (=60) (NO at step S1407), and also the generic recognition score Q2=75 is larger than the third threshold (=70) (YES at step S1409), and thus the correspondence extracting process is performed (step S1410). As a result, it is assumed that the alignment information A2 and a similarity M2=78 are obtained (see FIG. 9).

The similarity M2=78 is larger than the fourth threshold (=75) (NO at step S1412), and thus the example-based translation process is performed (step S1413). In this case, an example-based translation result is obtained in such a manner that the variable portion "<X2/London>" of the English example 204 at the address Y2 is replaced by the English example 208 "Los Angels" corresponding to the Japanese example 207. Then, the example-based translation result U2: "I'd like to reserve a business air ticket to Los Angels." is output as a translation result.

As described above, by extracting the correspondence relation between the example-based recognition result and the generic recognition result, the example-based translation process can be performed with accurately detecting a portion to be replaced in an example. Furthermore, even when a misrecognition occurs in the generic recognition process, if a variable portion is correctly recognized, it is possible to output a translation result correctly by changing the variable portion of the example-based recognition result.

Subsequently, it is assumed that the Japanese speech I3 is input. Incidentally, the speech I3 is similar to a pronunciation of a Japanese example at an address Y3 shown in FIG. 5, but a meaning of the speech I3 is completely different from that is the Japanese example at the address Y3. The speech I3 denotes "Could you add a chair?" in Japanese, but the Japanese example at the address Y3 denotes "When do you like to leave?" in Japanese.

Then, it is assumed that the R3 shown in FIG. 8 is obtained as the example-based recognition result of the speech I3. It is assumed that the example-based recognition result R3 is selected as a most probable example because the speech I3 has a similar pronunciation. At this time, the example-based recognition score of the example-based recognition result R3 is 65 that is smaller than the first threshold (=80) (NO at step S1404), and thus the generic recognition process is performed (step S1406).

By performing the generic recognition process, it is assumed that the Japanese text S3 and the generic recognition score Q3=80 are obtained (see FIG. 7). In this case, the example-based recognition score (65) is larger than the second threshold (=60) (NO at step S1407), and also the generic recognition score Q3=80 is larger than the third threshold (=70) (YES at step S1409), and thus the correspondence extracting process is performed (step S1410). As a result, it is assumed that the alignment information A3 and a similarity M3=45 are obtained (see FIG. 9).

The similarity M3=45 is smaller than the fourth threshold (=75) (YES at step S1412), and thus the rule-based translation process is performed (step S1408). As a result, a rule-based translation result, which is identical to the example-based translation result V3="Could you add a chair?" as shown in FIG. 13, is obtained.

As described above, if a correspondence relation can not be extracted, it is determined that the example-based recognition does not work correctly. Therefore, the rule-based translation method is employed instead of the example-based translation method. Thus, the machine translation apparatus 1200 can solve such the problem that the example-based translation process is enforced and thus an incorrect translation result, such as the example-based translation result U3: "When do you like to leave?" shown in FIG. 10, is output because the conventional machine translation apparatus can not switch in an appropriate manner between the rule-based translation method and the example-based translation method.

The machine translation apparatus 1200 according to the second embodiment can select either the rule-based translation method or the example-based translation method based on recognition, results obtained by the generic recognition process and the example-based recognition process, and then perform the machine translation by either the rule-based translation method or the example-based translation method. Therefore, the machine translation apparatus 1200 can take both advantages of the example-based translation method capable of translating with high quality and the rule-based translation method capable of translating any sentences. Furthermore, by including the speech recognition function specialized in examples, the machine translation apparatus 1200 can accurately detect not only a speech input similar to any one of the examples but also portions to be altered in the examples.

Figure 15:
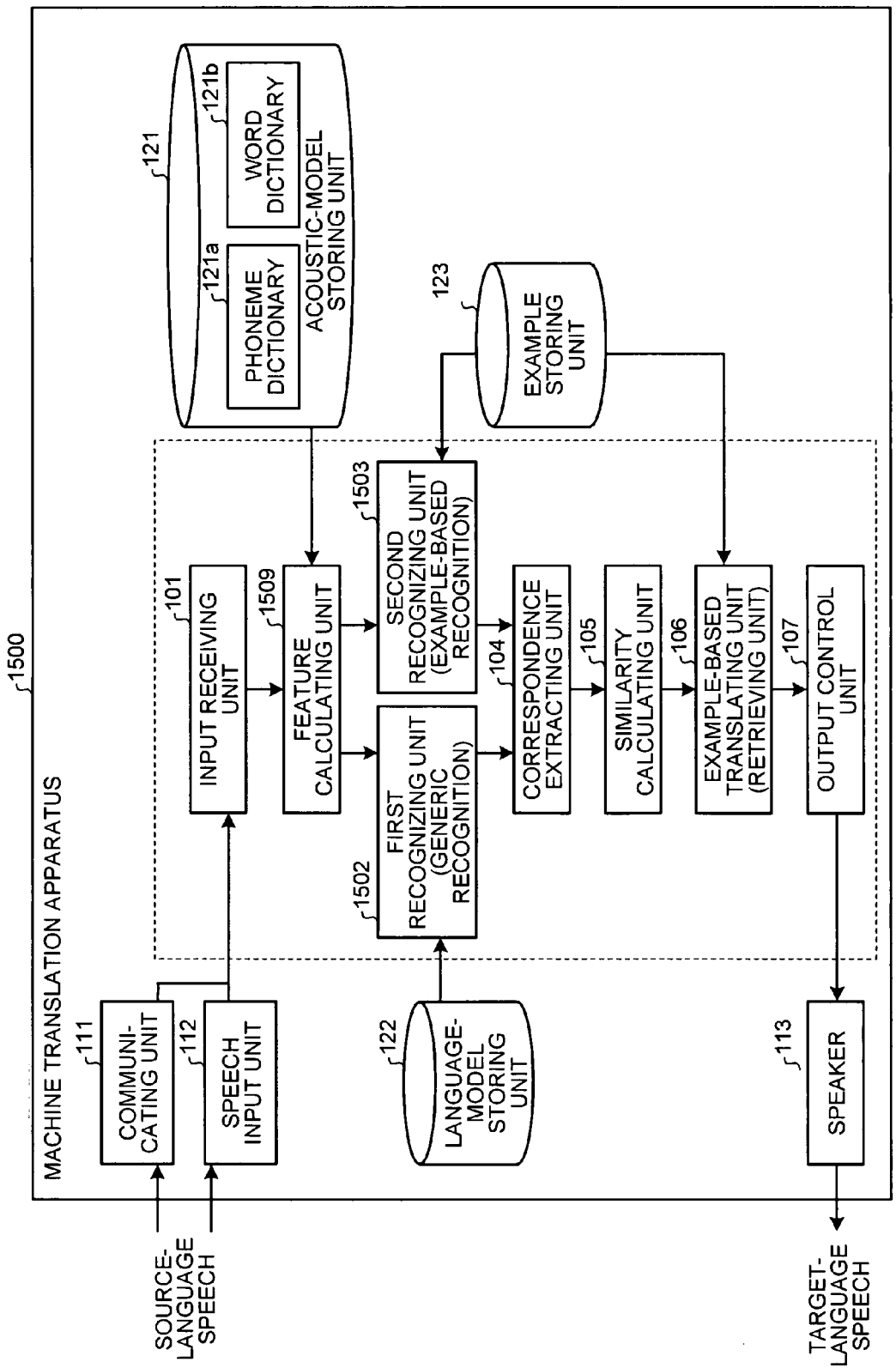
FIG. 15 is a block diagram of a machine translation apparatus according to a third embodiment of the present invention.

FIG. 15 is a block diagram of a machine translation apparatus 1500 according to a third embodiment of the present invention. In the machine translation apparatus 1500, a feature calculating process is performed by a specific processing unit in common between the generic recognition process and the example-based recognition process, because the feature calculating process is a common process.

The machine translation apparatus 1500 includes the communicating unit 111, the speech input unit 112, the speaker 113, the acoustic-model storing unit 121, the language-model storing unit 122, the example storing unit 123, the, input receiving unit 101, a first recognizing unit 1502, a second recognizing unit 1503, the correspondence extracting unit 104, the similarity calculating unit 105, the example-based translating unit 106, the output control unit 107, and a feature calculating unit 1509.

Differences between the machine translation apparatuses 100 and 1500 according to the first and third embodiments is that the machine translation apparatus 1500 further includes the feature calculating unit 1509, and also includes the first recognizing unit 1502 and the second recognizing unit 1503 instead of the first recognizing unit 102 and the second recognizing unit 103. The portions identical to those in FIG. 1 are denoted with the same reference numerals and the description of those portions is omitted.

The feature calculating unit 1509 receives the speech waveform data output from the input receiving unit 101, and calculates a feature of the speech. Specifically, the feature calculating unit 1509 calculates a feature of a speech signal of the speech by analyzing a time variation of frequencies, for example, by the application of the FFT analysis.

In other words, the feature calculating unit 1509 carries the function of calculating a feature of the speech, which is performed by the first recognizing unit 102 and the second recognizing unit 103 according to the first embodiment.

Accordingly, in the third embodiment, the first recognizing unit 1502 and the second recognizing unit 1503 carry other functions excluding the above function the first recognizing unit 1502 and the second recognizing unit 1503 respectively perform each of processes based on the feature calculated by the feature calculating unit 1509, which is the difference between according to the first embodiment and in the third embodiment.

Figure 16:
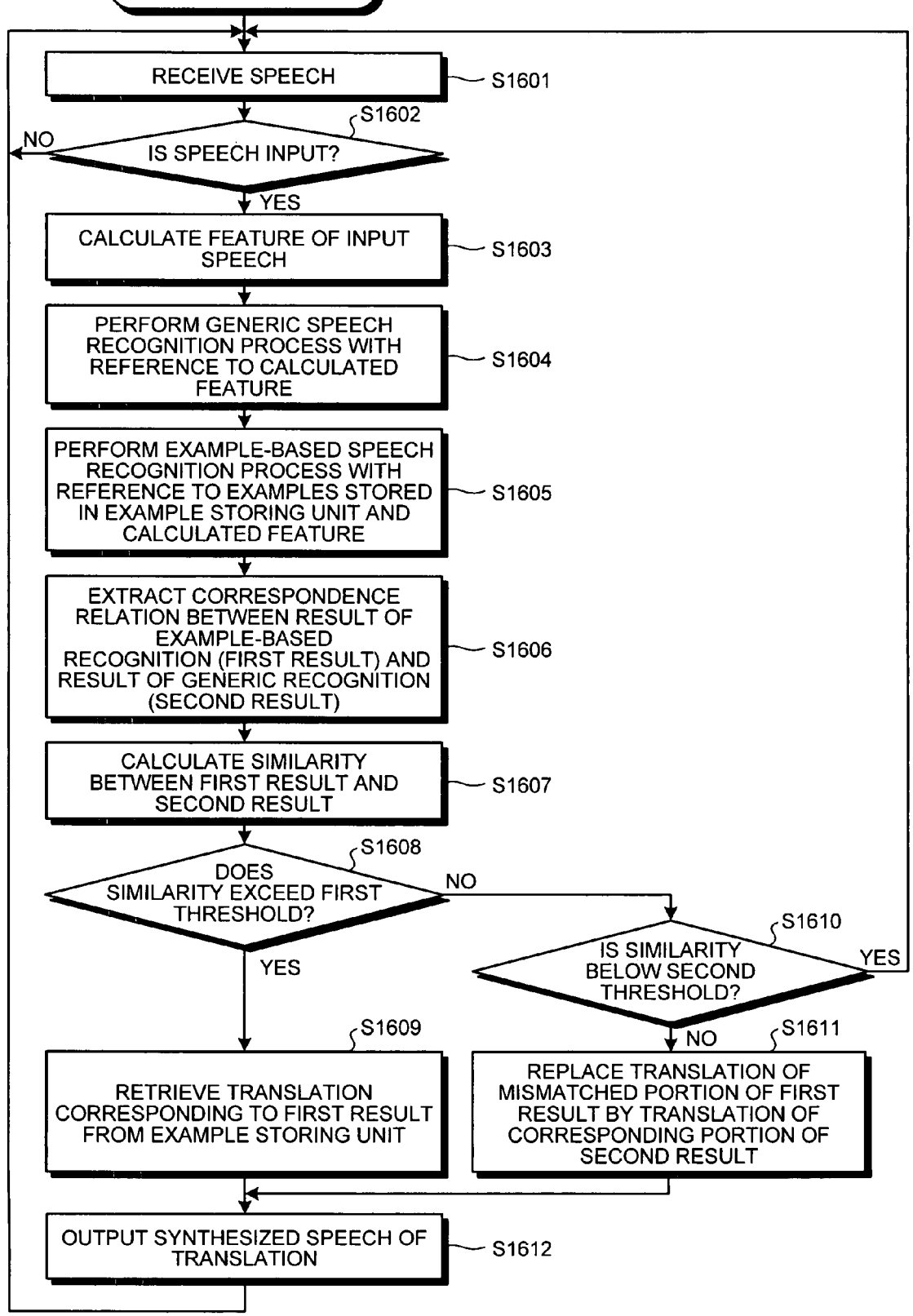
FIG. 16 is a flowchart of a machine translation process performed by the machine translation apparatus according to the third embodiment.

A machine translation process performed by the machine translation apparatus 1500 is described in detail below with reference to FIG. 16.

A speech-input receiving process in steps S1601 and S1602 is identical to that is in steps S1101 and S1102 shown in FIG. 11, and thus the description of steps S1401 and S1402 is omitted.

If a speech is input (YES at step S1602), the feature calculating unit 1509 calculates a feature of the speech by the application of the FFT analysis or the like (step S1603).

The first recognizing unit 1502 performs the generic speech recognition process on the speech by referring to the calculated feature (step S1604). Specifically, the first recognizing unit 1502 retrieves candidate words corresponding to the feature from the acoustic-model storing unit 121. Then, the first recognizing unit 1502 selects a most probable candidate word from the retrieved candidate words by referring to a language model, and outputs a generic recognition result that includes the most probable candidate word and a generic recognition score denoting a certainty of the most probable candidate word.

Then, the second recognizing unit 1503 performs the example-based speech recognition process on the speech by referring to the calculated feature and examples stored in the example storing unit 123 (step S1605). Specifically, the second recognizing unit 1503 retrieves candidate words corresponding to the feature from the acoustic-model storing unit 121. Then, the second recognizing unit 1503 selects a most probable candidate example from examples including the retrieved candidate words, which are retrieved from the examples stored in the example storing unit 123, and outputs an example-based recognition result that includes the most probable candidate example and an example-based recognition score denoting a certainty of the most probable candidate example.

A correspondence extracting process, a similarity calculating process, an example-based translation process, and an output control process in steps S1606 to S1612 are identical to those in steps S1105 and S1111 shown in FIG. 11, and thus the description of those in steps S1606 to S1612 is omitted.

As described above, in the machine translation apparatus 1500 according to the third embodiment, the feature calculating process is performed by a specific processing unit in common between the generic recognition process and the example-based recognition process, because the feature calculating process is a common process. Therefore, a configuration of the machine translation apparatus 1500 can be simplified, and thus the processing loads of the machine translation apparatus 1500 can be reduced.

Incidentally, the present invention is not limited to the above embodiments, and can be accordingly modified without departing from the scope of the inventive concept.

For example, the machine translation apparatus can be used not for machine translation but for selection of recognition results obtained by a plurality of different speech recognition methods depending on the obtained recognition results. Furthermore, data on the received speech can be used by other applications other than the translation, for example, an interactive human interface, a question answering (QA) system, or a retrieval system.

Moreover, the recognition process is not limited to the speech recognition process for a speech only. As long as the generic recognition process and the example-based recognition process are included in the recognition process, it is also applicable to, for example, a character recognition for a pen-based input or a sign-language recognition for a gesture input.

Furthermore, it is also possible to add read data to a speech recognition result or an example so that an extraction in the correspondence extracting process and a retrieval of an example can be performed with high accuracy. Furthermore, it is also possible to perform any one of the example-based machine translation and the rule-based machine translation in the machine translation apparatus process. Alternatively, if the example-based machine translation does not work well, it is possible to retranslate by the rule-based machine translation. To the contrary, if the rule-based machine translation does not work well, it is possible to retranslate by the example-based machine translation.

Figure 17:
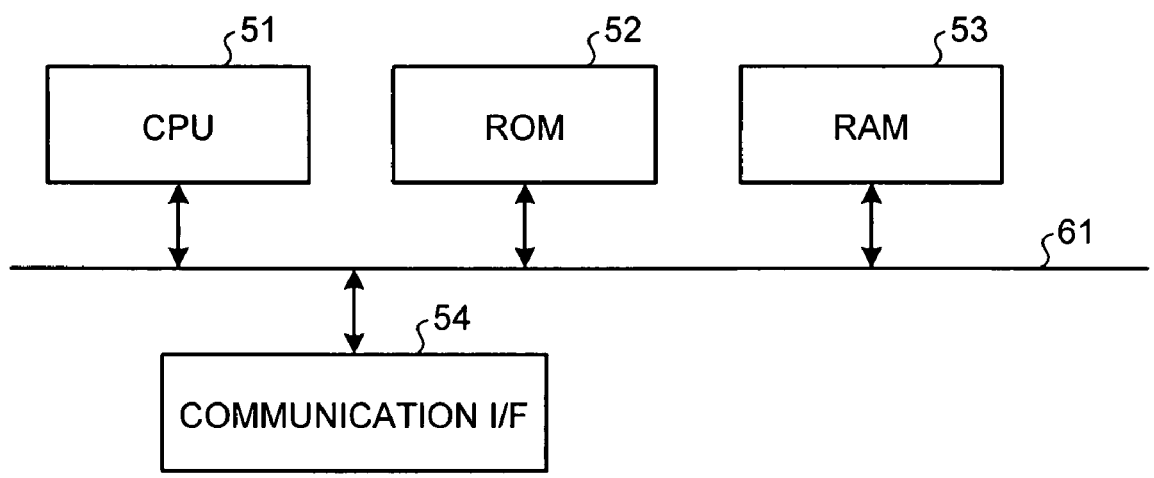
FIG. 17 is a block diagram for explaining a hardware configuration of the machine translation apparatuses according to the first to third embodiments.

A hardware configuration of the machine translation apparatuses according to the first to third embodiments is described below with reference to FIG. 17.

The machine translation apparatus includes a central processing unit (CPU) 51 as a control device, a read-only memory (ROM). 52 and a random access memory (RAM) 53 those as a storage device, a communication interface (I/F) 54, and a bus 61. The CPU 51, the ROM 52, the RAM 53, and the communication I/F 54 are connected to the bus 61. The communication I/F 54 is further connected to a network and communicates across the network.

A machine translation program executed by the machine translation apparatuses according to the first to third embodiments is stored, for example, on the ROM 52 in advance.

Alternatively, the machine translation program can be recorded in installable or executable format on a computer-readable recording medium such as a compact disk read-only memory (CD-ROM), a flexible disk (FD), a compact disk recordable (CD-R), and a digital versatile disk (DVD).

It is also possible to store the machine translation program in a computer connected to a network such as the Internet and download the machine translation program via the network. Moreover, it is also possible to provide or distribute the machine translation program via the network.

The machine translation program is configured to include the units as described above, i.e., the input receiving unit, the first recognizing unit, the second recognizing unit, the correspondence extracting unit, the similarity calculating unit, the example-based translating unit, the output control unit, the rule-based translating unit, and the feature calculating unit, those structure a modular composition. In the actual hardware, the CPU 51 reads out the machine translation program from the ROM 52 and executes the machine translation program, and then each of the above units are loaded on the main storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for machine-translating a first language into a second language, comprising:
    an example storing unit that stores therein a first-language example in association with a second-language example that is a translation of the first-language example;
    a receiving unit that receives a first-language speech;
    a first recognizing unit that recognizes the first-language speech as a first-language character string, and outputs a first recognition result;
    a second recognizing unit that recognizes the first-language speech as a most probable first-language example from among first-language examples stored in the example storing unit, and outputs a second recognition result;
    a calculating unit that calculates a similarity between the first recognition result and the second recognition result; and
    a retrieving unit that retrieves, when calculated similarity exceeds a predetermined threshold, a second-language example corresponding to the second recognition result from the example storing unit.

2. The apparatus according to claim 1, further comprising:
    an acoustic-model storing unit that stores therein an acoustic model in which a speech feature and a word are stored in an associated manner; and
    a language-model storing unit that stores therein a language model for defining a connection relation between words,
    wherein the first recognizing unit calculates a feature of the first-language speech, retrieves candidate words corresponding to calculated feature from the acoustic-model storing unit, and generates the first recognition result by selecting a most probable candidate word from the candidate words based on the language model.

3. The apparatus according to claim 1, further comprising an acoustic-model storing unit that stores therein an acoustic model in which a speech feature and a word are stored in an associated manner,
    wherein the second recognizing unit calculates a feature of the first-language speech, retrieves candidate words corresponding to calculated feature from the acoustic-model storing unit, and generates the second recognition result by selecting a most probable first-language example from first-language examples including retrieved candidate words.

4. The apparatus according to claim 1, further comprising a correspondence extracting unit that extracts an inter-word correspondence relation including information on a matched portion and a mismatched portion between a first word included in the first recognition result and a second word included in the second recognition result, wherein
    the retrieving unit retrieves a second-language example corresponding to a mismatched word that is a word corresponding to the mismatched portion from the example storing unit based on the inter-word correspondence relation, and replaces a word of the second-language example corresponding to the second recognition result and corresponding to the mismatched word by retrieved second-language example corresponding to the mismatched word.

5. The apparatus according to claim 4, wherein the correspondence extracting unit extracts the inter-word correspondence relation between the first word and the second word, when a position of the first word in the first language speech and a position of the second word in the first language speech are within a predetermined range.

6. The apparatus according to claim 1, further comprising:
    a rule storing unit that stores therein a rule of a correspondence relation between the first language and the second language; and
    a rule-based translating unit that translates the first recognition result into the second-language speech based on the rule, when the calculated similarity exceeds the predetermined threshold.

7. The apparatus according to claim 6, wherein
    the rule is a conversion rule regarding a grammar between the first language and the second language, and
    the rule-based translating unit translates the first recognition result into the second-language speech based on the conversion rule.

8. The apparatus according to claim 6, wherein
    the rule is a conversion rule regarding a vocabulary between the first language and the second language, and
    the rule-based translating unit translates the first recognition result into the second-language speech based on the conversion rule.

9. The apparatus according to claim 6, wherein
    the rule is a conversion rule regarding a semantic content between the first language and the second language, and
    the rule-based translating unit translates the first recognition result into the second-language speech based on the conversion rule.

10. The apparatus according to claim 6, wherein
    the rule is a statistical rule regarding statistical information on a correspondence relation between a first language phrase and a second language phrase, and
    the rule-based translating unit translates the first recognition result into the second-language speech based on the statistical rule.

11. The apparatus according to claim 1, further comprising:
an acoustic-model storing unit that stores therein an acoustic model in which a speech feature and a word are stored in an associated manner;
a language-model storing unit that stores therein a language model for defining a connection relation between words; and
a feature calculating unit that calculates a feature of the first-language speech, wherein
the first recognizing unit retrieves candidate words corresponding to the feature calculated by the feature calculating unit from the acoustic-model storing unit, and generates the first recognition result by selecting a most probable candidate word from the candidate words based on the language model, and
the second recognizing unit retrieves candidate words corresponding to the feature calculated by the feature calculating unit from the acoustic-model storing unit, and generates the second recognition result by selecting a most probable first-language example from first-language examples including retrieved candidate words from the example storing unit.

12. An apparatus for machine-translating a first language into a second language, comprising:
an example storing unit that stores therein a first-language example in association with a second-language example that is a translation of the first-language example;
a rule storing unit that stores therein a rule of a correspondence relation between the first language and the second language;
a receiving unit that receives a first-language speech;
a first recognizing unit that recognizes the first-language speech as a first-language character string, and outputs a first recognition result;
a second recognizing unit that recognizes the first-language speech as a most probable first-language example from among first-language examples stored in the example storing unit, calculates a first likelihood indicating a certainty of the most probable first-language example, and outputs a second recognition result including calculated first, likelihood;
a retrieving unit that retrieves, when calculated first likelihood exceeds a first threshold, a second-language example corresponding to the second recognition result from the example storing unit; and
a rule-based translating unit that translates, when the calculated first likelihood is below the first threshold, the first recognition result into a second-language speech based on the rule.

13. The apparatus according to claim 12, wherein
the first-language example includes a variable portion denoting a replaceable word, and
the second recognizing unit calculates the first likelihood for a portion of the first-language example with the variable portion excluded.

14. The apparatus according to claim 12, further comprising:
a calculating unit that calculates a similarity between the first recognition result and the second recognition result, wherein
the rule-based translating unit translates, when the calculated first likelihood is below the first threshold and the calculated similarity is below a fourth threshold, the first recognition result into the second-language speech based on the rule, when the calculated first likelihood is below a second threshold.

15. The apparatus according to claim 14, wherein the first recognizing unit further calculates a second likelihood indicating a certainty of the first recognition result, and outputs the first recognition result including calculated second likelihood.

16. The apparatus according to claim 15, wherein the rule-based translating unit translates the first recognition result into the second-language speech based on the rule, when the calculated second likelihood exceeds a third threshold.

17. The apparatus according to claim 12, further comprising:
a correspondence extracting unit that extracts an inter-word correspondence relation including information on a matched portion and a mismatched portion between a first word included in the first recognition result and a second word included in the second recognition result; and
a calculating unit that calculates a similarity between the first recognition result and the second recognition result, wherein
the rule-based translating unit translates, when the calculated first likelihood is below the first threshold and a second threshold, the first recognition result into the second-language speech based on the rule, and
the retrieving unit retrieves a second-language example corresponding to a mismatched word that is a word corresponding to the mismatched portion from the example storing unit based on the inter-word correspondence relation, and replaces a word of the second-language example corresponding to the second recognition result and corresponding to the mismatched word by the retrieved second-language example corresponding to the mismatched word, when the calculated first likelihood exceeds the second threshold and the calculated similarity exceeds a fourth threshold.

18. A method of machine-translating a first language into a second language, comprising:
outputting, using a processing unit, a first recognition result by recognizing a input first-language speech as a first-language character string;
outputting, using the processing unit, a second recognition result by recognizing the input first-language speech as a most probable first-language example from among first-language examples stored in an example storing unit that stores therein a first-language example. In association with a second-language example that is a translation of the first-language example;
calculating, using the processing unit, a similarity between the first recognition result and the second recognition result; and
retrieving, using the processing unit, when calculated similarity exceeds a predetermined threshold, a second-language example corresponding to the second recognition result from the example storing unit.

19. A computer program product comprising a non-transitory computer-usable medium having computer-readable program codes embodied in the medium that when executed cause a computer to execute:

outputting a first recognition result by recognizing a input first-language speech as a first-language character string;

outputting a second recognition result by recognizing the input first-language speech as a most probable first-language example from among first-language examples stored in an example storing unit that stores therein a first-language example in association with a second-language example that is a translation of the first-language example;

calculating a similarity between the first recognition result and the second recognition result; and retrieving, when calculated similarity exceeds a predetermined threshold, a second-language example corresponding to the second recognition result from the example storing unit.

* * * * *